United States Patent [19]
Ramey, III. et al.

[11] Patent Number: 5,104,086
[45] Date of Patent: Apr. 14, 1992

[54] COMPUTER WORK STATION

[76] Inventors: Thomas B. Ramey, III., 1312 South Chilton; Thomas J. Brown, 1416 South Chilton, both of Tyler, Tex. 75701; James C. Brown, 9739 Brentwood, Omaha, Nebr. 68114

[21] Appl. No.: 692,588

[22] Filed: Apr. 29, 1991

[51] Int. Cl.⁵ .............................................. B41J 11/02
[52] U.S. Cl. ................................ 248/442.2; 248/918
[58] Field of Search .................... 248/442.2, 447, 918, 248/455, 460, 441.1; 400/718; 40/341; 108/28

[56] References Cited

U.S. PATENT DOCUMENTS

| | | | |
|---|---|---|---|
| 728,646 | 5/1903 | Wood . | |
| 1,108,687 | 8/1914 | Boorman | 248/442.2 |
| 1,228,083 | 5/1917 | Warfel | 248/442.2 X |
| 1,700,629 | 1/1929 | Douglas | 400/718 X |
| 1,811,118 | 6/1931 | Fischer | 248/442.2 |
| 2,006,887 | 7/1935 | Doherty | 120/28 |
| 2,146,465 | 2/1939 | Coppock | 120/28 |
| 2,306,659 | 12/1942 | Wise | 248/442.2 X |
| 2,505,814 | 5/1950 | Voorhurst | 120/28 |
| 2,547,575 | 4/1951 | Gilbo | 178/58 |
| 2,711,716 | 6/1955 | Ziegler | 400/718 |
| 4,243,335 | 1/1981 | Singley | 40/341 X |
| 4,436,271 | 3/1984 | Manso | 248/460 |
| 4,546,947 | 10/1985 | Gesten | 248/442.2 |
| 4,635,893 | 1/1987 | Nelson | 248/558 |
| 4,717,112 | 1/1988 | Pirkle | 248/918 X |
| 4,863,124 | 9/1989 | Ball | 108/28 |
| 4,893,775 | 1/1990 | Long | 248/442.2 |

*Primary Examiner*—J. Franklin Foss
*Attorney, Agent, or Firm*—Mark D. Frederiksen; Dennis T. Griggs

[57] ABSTRACT

A computer work station includes a generally planar base plate with an upstanding easel connected to the forward end of the base plate. The easal has a projecting lip which will support documents or other copy in an upright position for viewing by the user of the work station. In the preferred embodiment, the easel is connected to a support member which is slidably connected to the base plate to permit transverse lateral slidable movement of the easel with respect to the base plate. The easel is adjustably connected to the support member to permit vertical adjustable movement of the easel with respect to the base plate.

12 Claims, 5 Drawing Sheets

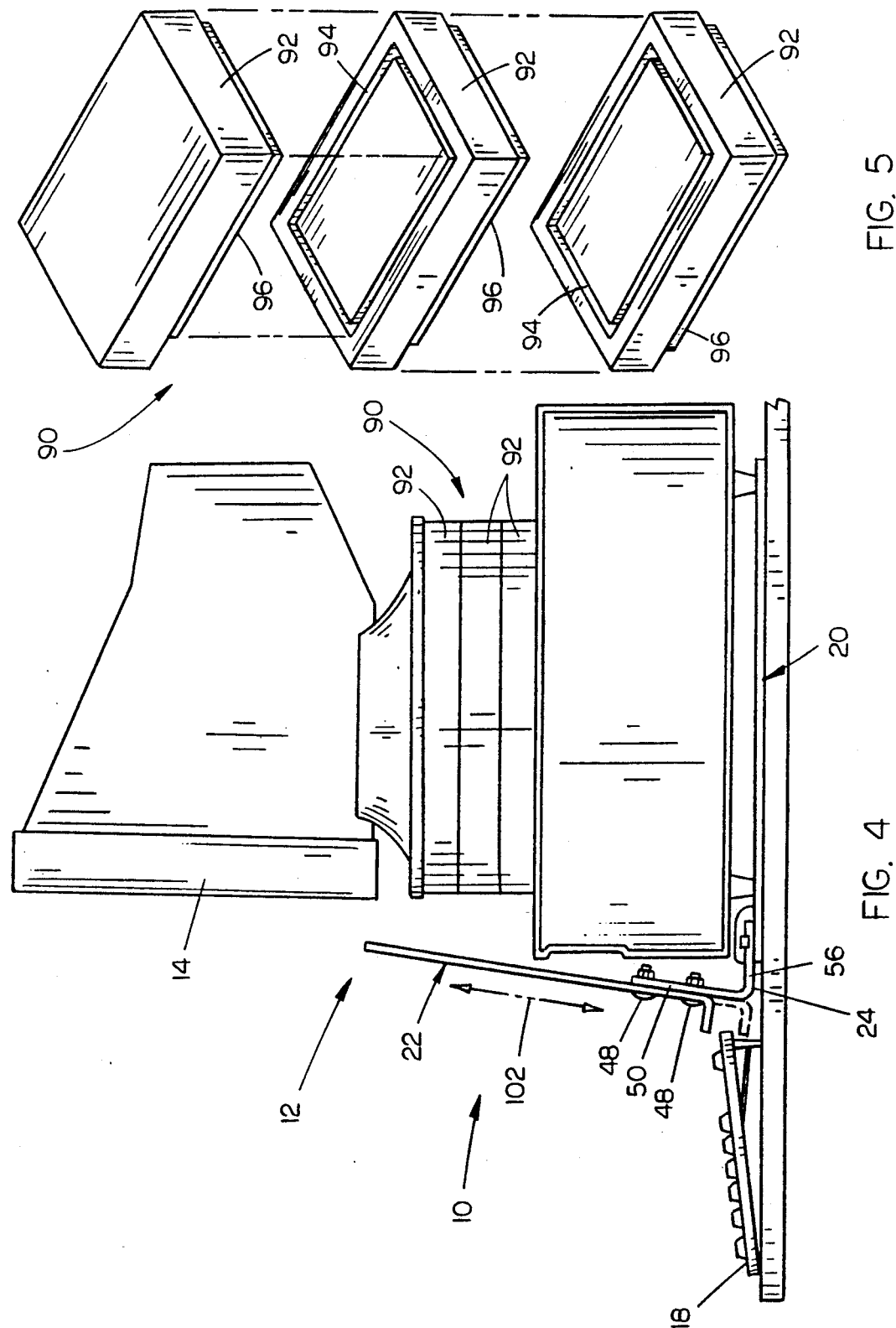

5,104,086

COMPUTER WORK STATION

TECHNICAL FIELD

The present invention relates generally to computer work stations, and more particularly to an apparatus for supporting documents to be viewed and transcribed utilizing a computer and its detached keyboard.

BACKGROUND OF THE INVENTION

With the recent proliferation of computers and word processing equipment, it has become a major consideration to provide an ergonomically correct work station. Prior copy holder stands are typically placed to one side of the computer, such that the computer operator must constantly look to the left or right to view the copy. This motion can lead to neck and back strain, as well as eye strain and other medical disorders because of the repeated movement between copy and computer monitor.

In an attempt to overcome the ergonomic inaccuracies of prior computer work stations, U.S. Pat. No. 4,893,775 to Roy Long discloses a copy holder stand which is disposed of between the computer keyboard and the computer monitor. While the '775 patent was a step forward in ergonomically correct computer work stations, it also suffers several problems.

In order to access the disk drive of the computer, it was necessary to pivot the entire copy holder back forward over the the documents would fall off of the copy holder stand.

Another problem with prior art computer work stations resides in the fact that work stations are designed for only a few specific types of computers. Thus, prior art work stations were not always designed to permit disk entry access from different locations, nor to retain various types and sizes of disk drive units, monitors, and keyboard placements.

It is therefore a general object of the present invention to provide an improved computer work station which is universal, so as to be capable of utilization with substantially all computer hardware.

Another object of the present invention is to provide a computer work station which permits vertical adjustment of the copy with respect to the placement of the detached keyboard.

A further object is to provide a computer work station which permits access to the disk drive while maintaining the copy holder stand in an upright position.

Yet another object of the present invention is to provide a computer work station which is economical to manufacture, refined in appearance, and simple to utilize. These and other objects will be apparent to those skilled in the art.

SUMMARY OF INVENTION

The computer work station of the present invention includes a generally planar base plate with an upstanding easel connected to the forward end of the base plate. The easel has a projecting lip which will support documents or other copy in an upright position for viewing by the user of the work station. In the preferred embodiment, the easel is connected to a support member which is slidably connected to the base plate to permit transverse lateral slidable movement of the easel with respect to the base plate. The easel is adjustably connected to the support member to permit vertical adjustable movement of the easel with respect to the base plate.

BRIEF DESCRIPTION OF THE DRAWINGS

FIG. 4 is a side elevational view taken from the right side of FIG. 2;

FIG. 5 is an exploded perspective view of the monitor stand of the present invention;

DESCRIPTION OF THE PREFERRED EMBODIMENT

Figure 1:
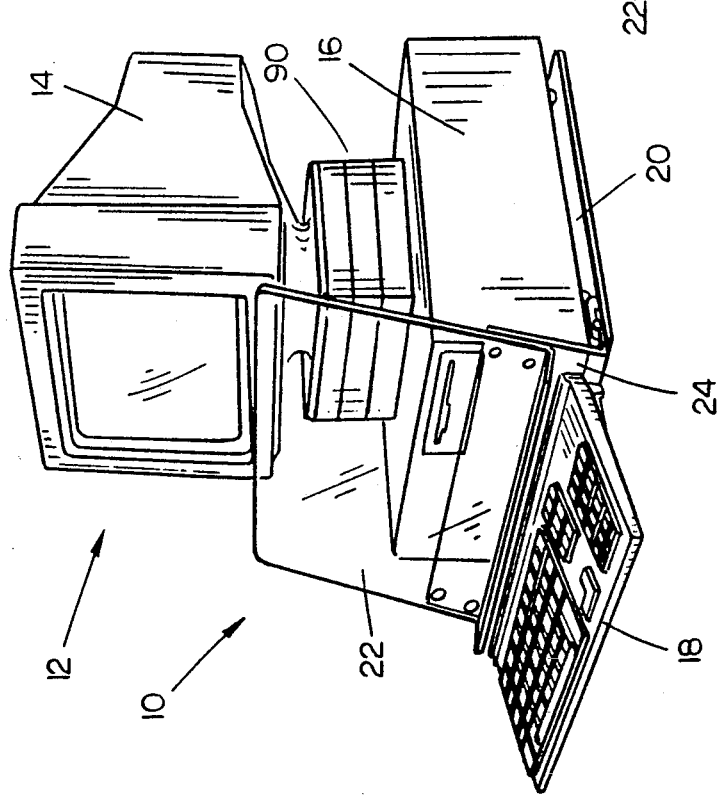
FIG. 1 is a perspective view of the present invention shown in use with computer hardware.

Referring now to the drawings, in which similar or corresponding parts are identified with the same reference numeral, and more particularly to FIG. 1, the computer work station of the present invention is designated generally at 10 and is designed for use with a computer 12 comprised of a monitor 14, a drive unit 16 and a keyboard 18. Work station 10 is comprised of three interconnecting components: a base plate 20, easel 22, and easel support member 24.

Figure 3:
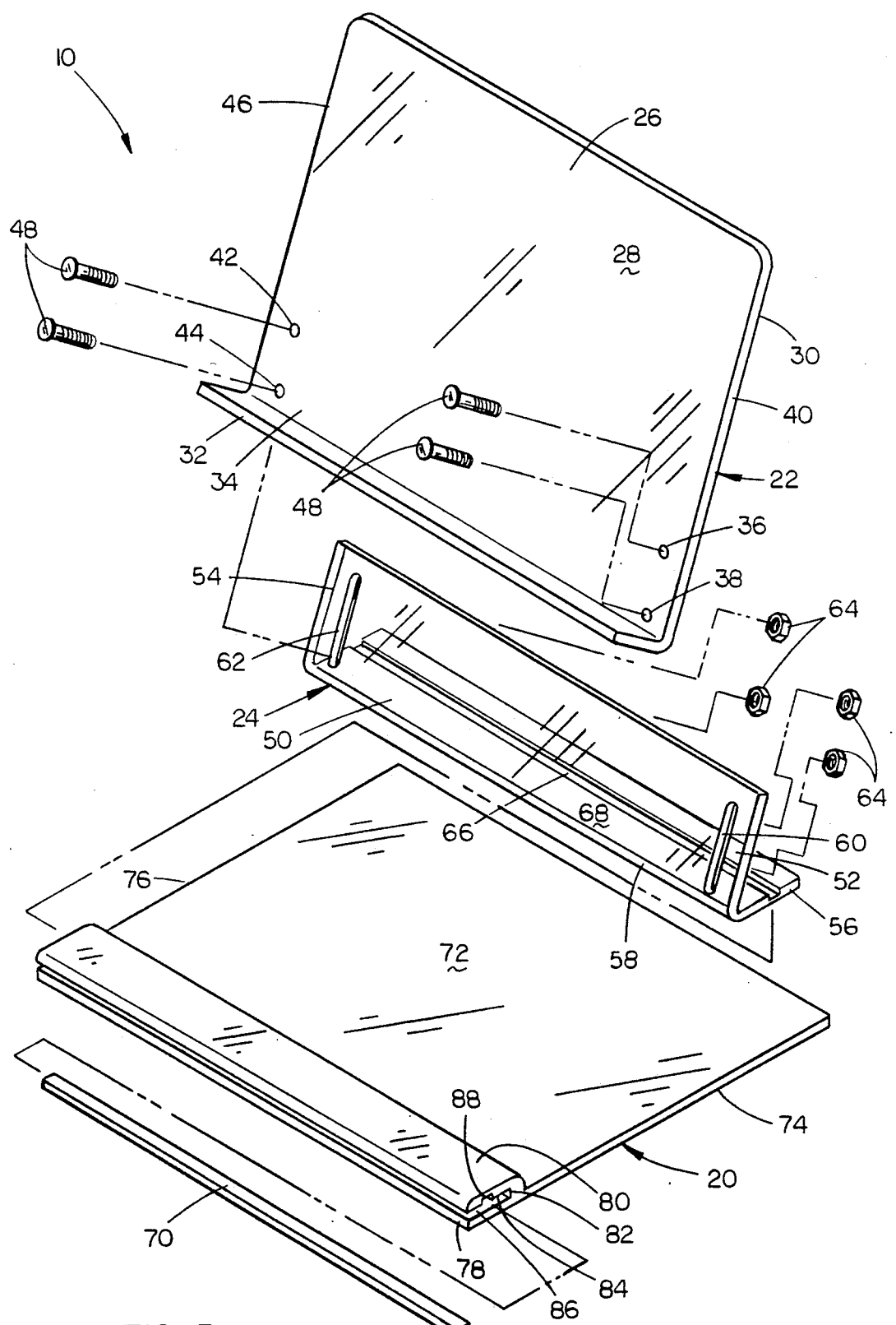
FIG. 3 is an exploded perspective view of the present invention.

Referring now to FIG. 3, easel 22 includes a generally rectangular and vertically oriented back plate 26 having forward and rearward surfaces 28 and 30 respectively. A lip 32 projects perpendicularly from the lower edge 34 of back plate 26, and is utilized to support documents to be viewed. A pair of vertically aligned and spaced apart apertures 36 and 38 are formed adjacent the right vertical edge 40 of back plate 26, with the lower aperture 38 adjacent lip 32. A similar pair of apertures 42 and 44 are formed adjacent left vertical edge 46 with lower aperture 44 adjacent lip 32. Apertures 36, 38, 42 and 44 will receive bolts 48 to adjustably connect easel 22 to easel support member 24, as described in more detail herein below.

Easel support member 24 is a generally L-shaped member having a front generally vertical panel 50 with right and left vertical edges 52 and 54 respectively, and a generally horizontal leg 56 projecting rearwardly from the bottom edge 58 from front panel 50. Front panel 50 includes a right and left vertically oriented slot 60 and 62 respectively, formed adjacent right and left edges 52 and 54, and located to receive bolts 48 through apertures 36, 38, 42 and 44 in easel 22. Nuts 64 are threaded on bolts 48 to maintain the position of easel 22 on support member 24.

As shown in FIG. 4, front plate 50 is connected to leg 56 at an acute angle, such that easel 22 will be tipped slightly rearwardly towards the computer monitor 14. This angle will assist in retaining of documents on easel 22 without the requirement of clips or other fasteners.

A groove 66 is formed in the upper face 68 of leg 56, and extends from the left to right edges of leg 56, as shown in FIG. 3. Groove 66 is designed to slidably engage the lower half of an elongated rod 70, as described in more detail herein below.

Base plate 20 includes a top surface 72, right and left edges 74 and 76 respectively and a forward edge 78. A lip 80 projects upwardly from a location spaced rearwardly of forward edge 78, and is bent forwardly parallel to base plate 20 so as to form a U-shaped channel 82 with an upper surface 84 and lower surface 86. A groove 88 in upper surface 84 of channel 82 corresponds with groove 66 in leg 56 of easel support member 24, and will receive the upper half of elongated rod 70. Preferably, rod 70 is fixed within groove 88 such that its lower half projects downwardly from upper surface 84 of channel 82. In this way, leg 56 may be slidably mounted within channel 82, with groove 66 receiving the lower half of rod 70. Support member 24 is thereby capable of transverse slidable adjustment with respect to base plate 20.

Referring now to FIGS. 4 and 5, computer monitor 14 is supported on a pedestal 90 which is formed of a plurality of stackable plates 92. Each plate 92 has a groove 94 formed in its upper surface which will receive a projecting lip 96 on the lower surface of an adjacent plate 92 to lock the plates into engagement In this fashion, as many plates 92 as are necessary may be stacked so as to raise monitor 14 to the appropriate level for the particular computer 12 as well as the particular height of the person utilizing the computer station 10.

In use, drive unit 16 is set on base plate 20. Pedestal 90 is rested on drive unit 16, so as to support monitor 14 at the desired height. Keyboard 18 is located in front of easel support member 24, such that easel 22 is interposed between keyboard 18 and monitor 14.

Figure 2:
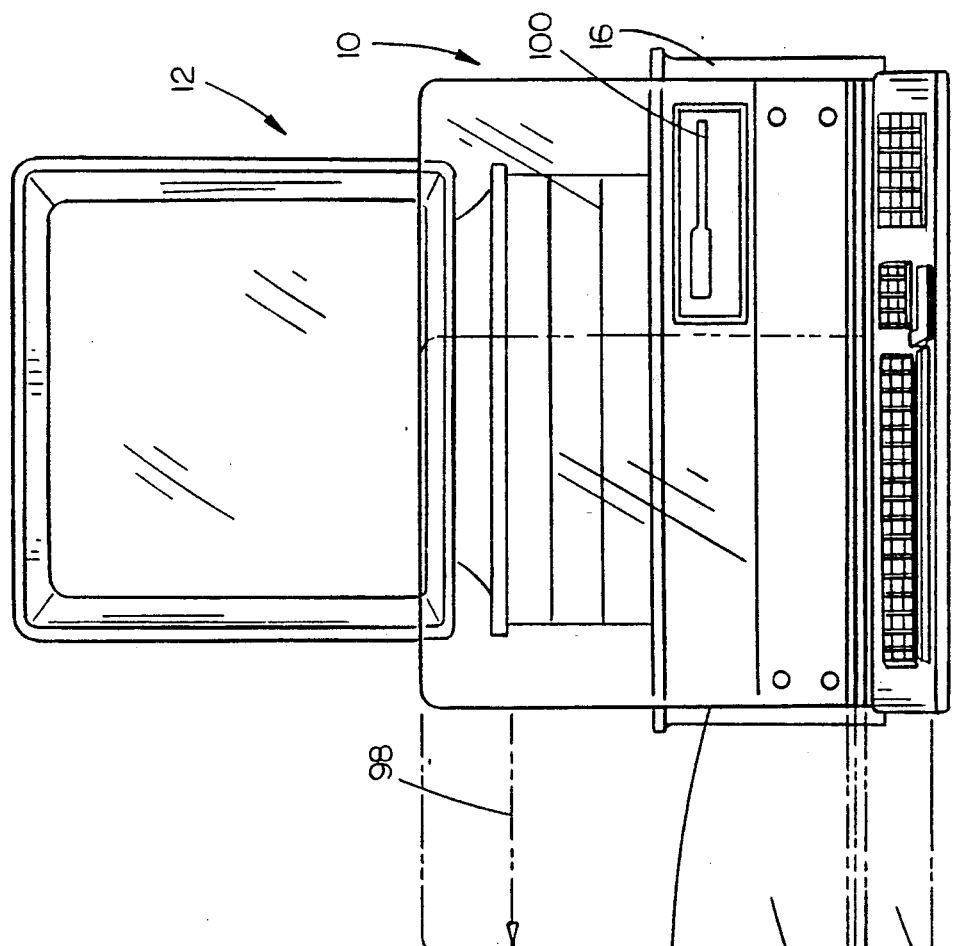
FIG. 2 is a front elevational view of the invention as shown in FIG. 1.

As shown in FIG. 2, easel 22 and support member 24 are slidable transversely with respect to computer drive unit 16, as shown by arrow 98, to permit access to the drive opening 100 in drive unit 16. Since easel 22 and support member 24 are slidable on base plate 20, as shown in FIG. 3, full access to all sides of drive unit 16 are permitted, and virtually any type of hard drive 16 is accessible to the user of the computer work station 10. In addition, the transverse slidable movement of easel 22 permits the user to leave documents or other copy on the easel while accessing the drive opening 100.

Figure 6:
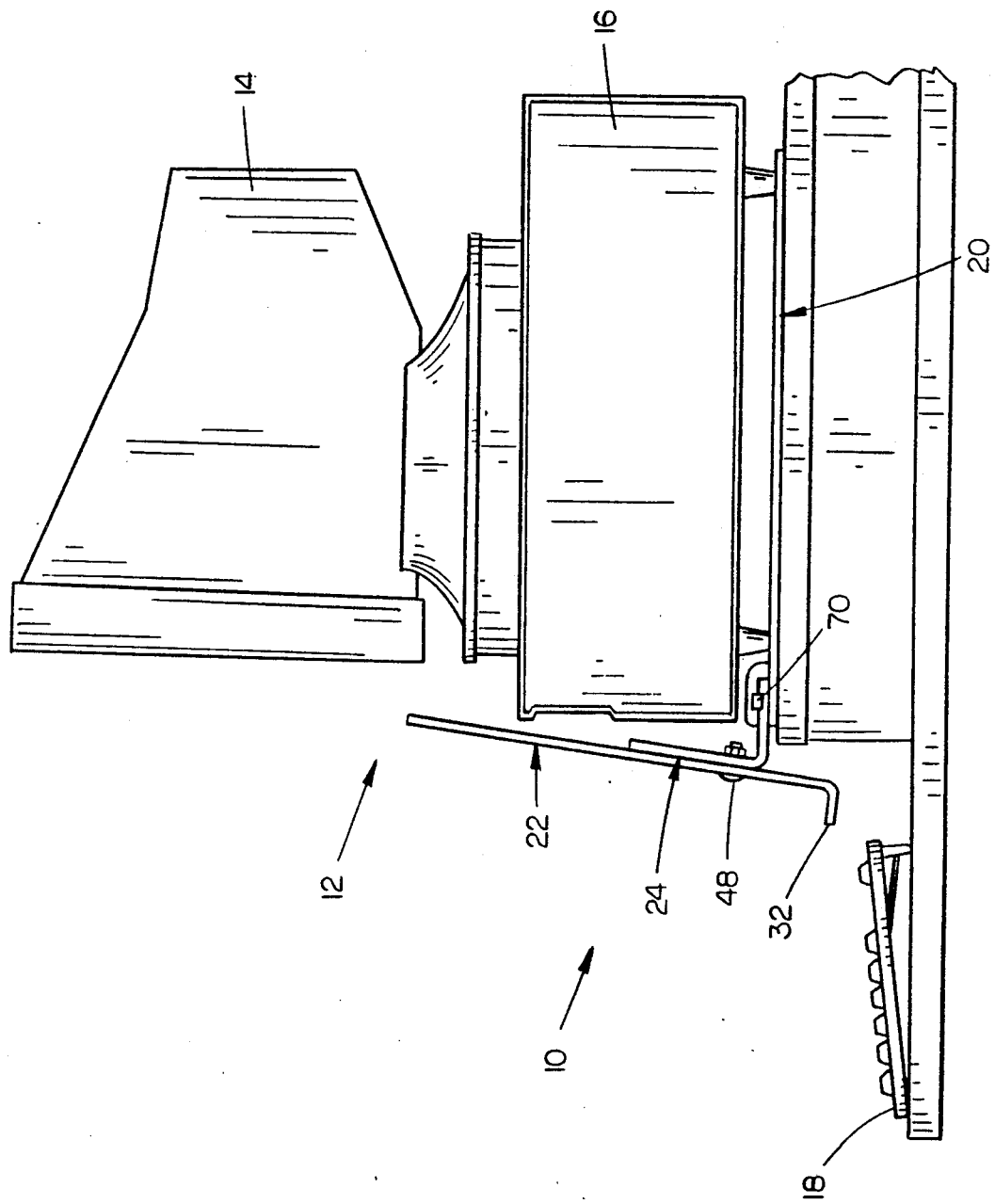
FIG. 6 is a side elevational view similar to FIG. 4, showing the easel repositioned for a different type of computer hardware.

In addition, easel 22 is vertically adjustable with respect to easel support member 24, as shown in FIG. 4. Bolts 48 are preferably plastic, and easily tightened and loosened so as to slide within slots 60 and 62 (as shown in FIG. 3) to a variety of positions, as shown by arrow 102 (FIG. 4). In fact, one bolt 48 may be removed from the lower apertures 38 and 44 (as shown in FIG. 3) such that easel 22 may be lowered to a position with lip 32 located below the level of base plate 20, as shown in FIG. 6. This is useful in situations where keyboard 18 is located at a lower level than drive unit 16.

Figure 9:
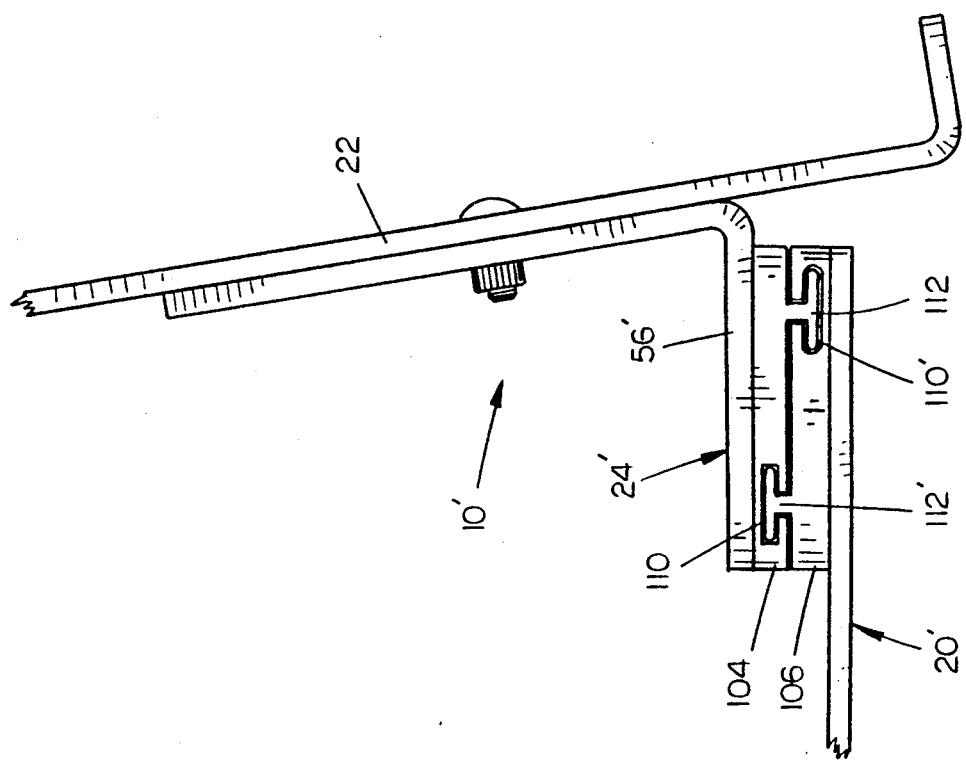
FIG. 9 is an enlarged side elevational view of a third embodiment of the invention.

Referring now to FIG. 9, a second embodiment of the work station is designated generally at 10' which utilizes an identical easel 22 in combination with a slightly modified easel support member 24' and base plate 20'. In order to simplify the manufacture of work station 10', the second embodiment of the invention utilizes a pair of opposing and corresponding upper and lower slide plates 104 and 106, which slidably engage one another for transverse slidable movement. Upper slide plate 104 is formed with a T-shaped longitudinal channel 110 parallel to a projecting ridge 112 which has a T-shaped cross-section. Upper plate 104 is mounted to the bottom surface of leg 56' of support member 24' such that groove 110 and ridge 112 project downwardly.

Lower slide plate 106 is identical to upper slide plate 104, and has a T-shaped longitudinal groove 110' and longitudinal ridge 112' having a T-shaped cross-section. Lower slide plate 106 is mounted to the upper surface of base plate 20' such that groove 110' and ridge 112' are oriented upwardly so as to cooperate with ridge 112 and groove 110 respectively, of upper slide plate 104. Slide plates 104 and 106 are affixed to support member 24' and base plate 20' with adhesive, or in any other conventional fashion.

Figure 7:
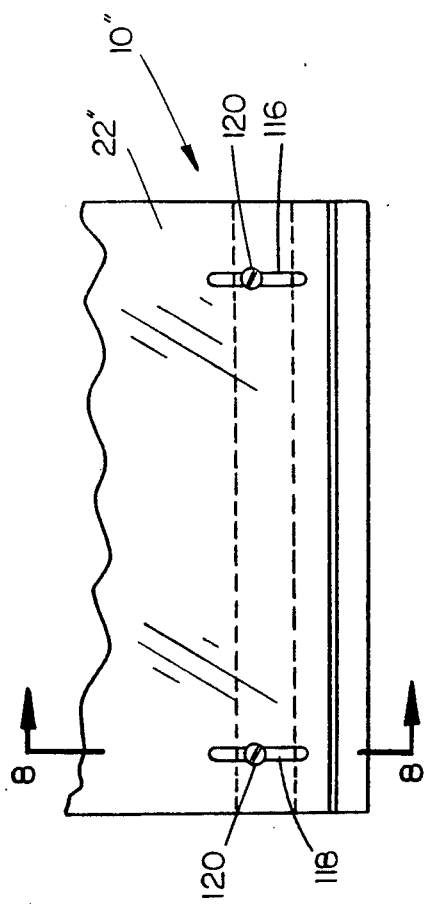
FIG. 7 is a front elevational view of a second embodiment of the invention.
Figure 8:
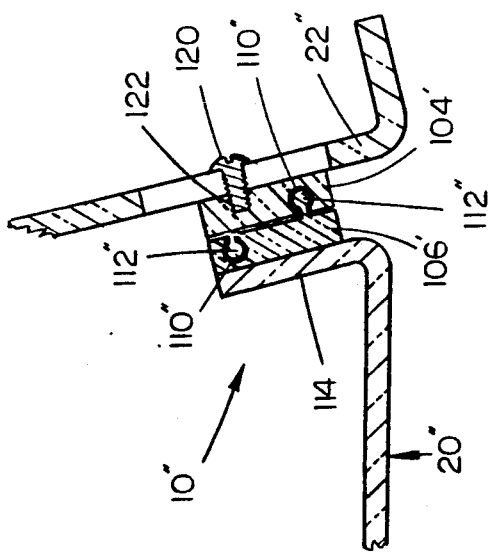
FIG. 8 is a sectional view taken at lines 8—8 in FIG. 7.

Referring now to FIGS. 7 and 8, a third embodiment of the invention is designated generally at 10", and includes an easel 22" connected by a pair of cooperable slide plates 104' and 106'. In this embodiment of the invention, base plate 20' has an upwardly extending lip 114 formed along the forward edge thereof. A slide plate 106' is affixed along lip 114 and has a forwardly projecting ridge 112" and a forwardly oriented groove 110" formed parallel to one another and longitudinal along plate 106'. An identical slide plate 104' also has a ridge 112" and a groove 110" formed therein so as to cooperate with the ridge and groove in plate 106'. Forward slide plate 104' is affixed to the rearward surface of easel 22" to permit transverse slidable motion of the easel with respect to base plate 20".

Because the intermediate support member of the previous embodiments has been eliminated in this third embodiment of the invention, a pair of vertical slots 116 and 118 are formed adjacent the right and left edges of the easel 22", as shown in FIG. 7 A bolt 120 is journaled through slots 116 and 118, each bolt being threaded into a threaded aperture 122 (see FIG. 8) formed in slide plate 104,. Bolts 120 may be loosened so that easel 22" may be adjusted vertically with respect to base plate 20".

Whereas the invention has been shown and described in connection with the preferred embodiments thereof, it will be understood that many modifications, substitutions and additions may be made which are within the intended broad scope of the appended claims. For example, the angle between front panel 50 and leg 56 of easel support member 24 may be any convenient angle. Similarly, lip 32 on easel 22 may be formed at an acute angle, rather than the right angle described in the preferred embodiment.

There has therefore been shown and described an improved computer work station which accomplishes at least all of the above stated objects

We claim:

1. A computer work station comprising:
 a generally planar base plate having forward and rearward ends and right and left sides;
 a support member connected to the forward end of said base plate, and including an upstanding front panel member;
 an upstanding easel connected to the forward end of said base plate, adapted for supporting a document thereon;
 said easel being adjustably connected to said support member front panel for vertical adjustment; and
 means for adjustably connecting said easel to said base plate for selective vertical adjustment with respect to the base plate, whereby said easel may be raised or lowered;
 said means for adjustably connecting said easel to said base plate including:

a pair of horizontally spaced apart, vertical slots formed in said front panel;

a first aperture in said front panel adjacent said right edge;

a second aperture in said front panel adjacent said left edge;

said first and second apertures located to correspond with said slots in said support member;

a first fastener selectively fastened through said first aperture and the associated vertical slot in said support member;

a second fastener selectively fastened through said second aperture and the associated vertical slot in said support member, said fasteners selectively fastenable to maintain the easel in a predetermined vertical position with respect to the support member.

2. The computer work station of claim 1, wherein said support member is adjustably connected to said base plate for selective transverse movement from side to side with respect to said base plate.

3. The computer work station of claim 1, wherein said easel includes a lip projecting outwardly from the lower end thereof for supporting a document thereon.

4. The computer work station of claim 3, wherein said lip projects at an angle perpendicular to said easel.

5. The computer work station of claim 1, wherein said easel is connected to said base plate at an acute angle, such that the easel is tilted rearwardly from the vertical.

6. A computer work station, comprising:

generally planar base plate having forward and rearward ends and right and left sides;

an upstanding easel connected to the forward end of said base plate, adapted for supporting a document thereon;

said base plate including a support member adjustably connected to the forward end thereof;

said support member being connected to the lower end of said easel; and means for adjustably connecting said easel to said base plate for selective transverse movement from side to side with respect to the base plate, whereby said easel may be selectively adjusted from side to side.

7. The computer work station of claim 6, wherein said support member includes an upstanding front panel member connected to said easel.

8. The computer work station of claim 6, wherein said means for adjustably connecting said easel to said base plate includes:

a lip formed in the forward end of said base plate to form a transversely extending channel; and said support member having a generally horizontal transversely extending leg slidably connected to said base plate in said channel.

9. The computer work station of claim 6, wherein said easel is adjustably connected to said support member for selective vertical adjustment with respect to said base plate.

10. The computer work station of claim 6, wherein said easel includes a lip projecting outwardly from the lower end thereof for supporting a document thereon.

11. A computer work station, comprising:

a generally planar base plate having forward and rearward ends and right and left sides;

an upstanding easel connected to the forward end of said base plate, adapted for supporting a document thereon; and means for adjustably connecting said easel to said base plate for selective transverse movement from side to side with respect to the base plate, whereby said easel may be selectively adjusted from side to side, said means for adjustably connecting said easel to said base plate including:

said base plate having an upwardly projecting lip extending transversely across the forward end thereof;

a first slide plate extending continuously along said lip;

a second slide plate extending transversely along the rearward surface of the lower end of said easel;

said first and second slide plates having means for slidably connecting the slide plates for transverse slidable movement, whereby said easel is transversely movable with respect to the base plate.

12. The computer work station of claim 6, wherein said means for adjustably connecting said easel to said base plate includes:

a first slide plate extending transversely along the forward end of said base plate;

a second slide plate extending transversely along said support member leg; and said first and second slide plates having means for slidably connecting the slide plates for transverse slidable movement, whereby said easel is transversely movable with respect to the base plate.

* * * * *

UNITED STATES PATENT AND TRADEMARK OFFICE
CERTIFICATE OF CORRECTION

PATENT NO. : 5,104,086
DATED : April 14, 1992
INVENTOR(S) : Thomas B. Ramey, III, et al.

It is certified that error appears in the above-identified patent and that said Letters Patent is hereby corrected as shown below:

In the Abstract

At line 3, "easal" should be -- easel --.

In the Specification

Column 1, line 31, "the the" should be -- the keyboard. Unless the copy was clipped to the copy holder back, the --.

Column 3, line 24, "engagement In" should be -- engagement. In --.

Signed and Sealed this

Twenty-fifth Day of January, 1994

Attest:

BRUCE LEHMAN

*Attesting Officer*     Commissioner of Patents and Trademarks